United States Patent [19]

Tsubone

[11] Patent Number: 5,223,070
[45] Date of Patent: Jun. 29, 1993

[54] APPARATUS FOR MANUFACTURING AN ENDLESS RIBBON

[75] Inventor: Shigemasa Tsubone, Tokyo, Japan

[73] Assignee: Seidensha Electronics Co., Ltd., Tokyo, Japan

[21] Appl. No.: 783,344

[22] Filed: Oct. 28, 1991

[30] Foreign Application Priority Data

Nov. 24, 1990 [JP] Japan .................................. 2-320266

[51] Int. Cl.$^5$ .......................... B32B 31/18; B32B 31/20
[52] U.S. Cl. .................................... 156/353; 156/502; 156/510; 156/73.4
[58] Field of Search ............... 156/304.1, 353, 73.4, 156/157, 502, 507, 510, 511, 267, 269, 270, 304.6

[56] References Cited

U.S. PATENT DOCUMENTS

| | | | |
|---|---|---|---|
| 3,821,048 | 6/1974 | Acker et al. | 156/164 |
| 3,981,387 | 9/1976 | Gottschlich | 156/73.4 |
| 4,119,448 | 10/1978 | Hermanson et al. | 156/73.4 |
| 4,609,422 | 9/1986 | Becking | 156/502 |
| 4,935,081 | 6/1990 | Becking | 156/73.4 |

OTHER PUBLICATIONS

Partial translation for Japanese Patent Laid-Open Sho 63(1988)-132030.

*Primary Examiner*—Jill L. Heitbrink
*Attorney, Agent, or Firm*—Longacre & White

[57] ABSTRACT

An apparatus for manufacturing an endless ribbon comprises a pair of clamping devices situated spaced apart from each other along a ribbon path for overlapping two ends of a ribbon one above the other, an ultrasonic welding device for welding the overlapped portion of the ribbon along a weld line, a guide member to be inserted between the main ribbon body and superfluous ribbon end joined by way of the weld line, the thickness of the guide member on the side of the ribbon end being gradually reduced toward the weld line, and a cutter having an arcuate blade each for cutting off the superfluous ribbon end in the vicinity of the weld line in cooperation with the guide member. The endless ribbon is manufactured by a method of clamping the two ends of a ribbon overlapped one above the other, welding a central part of the overlap along a weld line, inserting the guide member between the main ribbon body and the ribbon end and cutting off the ribbon end at a position in the vicinity of the weld line.

4 Claims, 4 Drawing Sheets

1

APPARATUS FOR MANUFACTURING AN ENDLESS RIBBON

BACKGROUND OF THE INVENTION

1. Field of the Invention

The present invention concerns a method of and an apparatus for manufacturing an endless ribbon such as an ink ribbon used by a printer and, more particularly, it relates to a method of and apparatus for manufacturing an endless ribbon which is adapted to join the two ends of the ribbon by welding them together and, subsequently, remove the superfluous ends of the ribbon by cutting them.

2. Description of the Prior Art

Various kinds of printers are used as printing devices such as those for word processors or computers, but the most common type is a wire-dot printer which strikes fine wires through an ink ribbon against a sheet of paper at high speed.

Ink ribbons used in wire-dot printers are fabricated by impregnating a synthetic resin fabric with ink, and endless ribbons are generally used since they can be used continuously by circulating without causing problems by needing to be exchanged or rewound.

In a known apparatus for manufacturing such endless ribbons, the two ends of a ribbon are overlapped in a cross shape with identical surfaces facing each other, and ultrasonic waves are applied to a central part of the overlapped portion to weld together the overlapped portion and simultaneously cut off superfluous ribbon ends, as described in, for example, Japanese Patent Publication Sho 54-2235 (1979) (cited in the specification of Japanese Patent Laid-Open Sho 63-132030). In another known apparatus, the two ends of a ribbon are overlapped in parallel one above the other with different surfaces facing each other, and ultrasonic waves are applied to weld together a central part of the overlapped portion. Subsequently, the superfluous ribbon ends are cut off by using scissors or a similar tool designed especially for this purpose.

In the existing apparatus for manufacturing endless ribbons described above, the former apparatus that uses the method of simultaneous welding and cutting the ribbon has a problem in that the tensile strength of the ribbon in the welded portion is low. The latter apparatus that cuts off the superfluous ribbon ends also involves a problem in that it requires a manual operation for cutting off the superfluous ribbon ends, which is time-consuming and the quality of the finished products varies.

In view of the above situation, the present inventor has previously proposed an apparatus for manufacturing an endless ribbon which is adapted to cut off superfluous ribbon ends by using a laser beam after welding the ribbon ends together.

Japanese Patent Laid-Open Sho 63-132030 proposes on for manufacturing endless ribbon has various advantages, such as the superfluous ribbon which ends can be cut as short as possible with minimal loss, shaping is easy, and the width of the final weld line can be minimized. However, heating is applied a total of three times to positions near the welded portion, that is, during the welding, during the cutting off of the superfluous ribbon ends and during final shaping, and this heating causes a problem in that the impregnated resin component in the welded portion is melted and then solidified, in other words, the portion becomes stiffened which deteriorates the flexibility and softness of the fibrous ribbon.

OBJECT OF THE INVENTION

The present invention has been accomplished in view of the foregoing situation and it is an object of the present invention to provide a method of and an apparatus for manufacturing an endless ribbon which is capable of improving quality in the welded portion of the ribbon.

Another object of the present invention is to provide an apparatus for manufacturing an endless ribbon which is capable of achieving a stable clamped state when an overlapped portion of the two ends of the ribbon is clamped.

SUMMARY OF THE INVENTION

The foregoing object of the present invention can be achieved by a method of manufacturing an endless ribbon which comprises:

overlapping the two ends of a ribbon one above the other in the longitudinal direction with a narrow space being kept between them, clamping the two ends of the overlapped portion in two places respectively, applying ultrasonic welding to a central part of the overlapped portion of the ribbon along a weld line which is at an angle to the longitudinal direction of the ribbon, positioning a guide member between a main ribbon body and a superfluous ribbon end that is overlapped therewith longitudinally and is joined thereto by the weld line, and then cutting off the superfluous ribbon end from a position in the vicinity of the weld line.

The above-mentioned method can be practiced efficiently by using an apparatus for manufacturing an endless ribbon comprising:

a pair of clamping devices which are positioned along the path of a ribbon and are separated longitudinally from each other, for overlapping the two ends of a ribbon longitudinally one above the other with a narrow space being kept between them, an ultrasonic welding device for welding together the central part of the overlapped portion of the ribbon along a weld line which is at an angle to the longitudinal direction of the ribbon, a guide member to be inserted between a main ribbon body and a superfluous ribbon end which is overlapped longitudinally therewith and joined thereto by the weld line, the thickness of the guide member being, on the side thereof nearer the superfluous ribbon end, gradually reduced toward the weld line, and a cutter having an arcuate blade edge formed at least along its circumferential edge in contact with the superfluous ribbon end, for cutting off the superfluous ribbon end in the vicinity of the weld line in cooperation with the guide member.

In the present invention, since a superfluous ribbon end is cut off by the combined use of a guide member and a cutter, the thermal load (the amount of processing heat) applied to the weld line portion can be reduced, and thus resolidifying and hardening the impregnated resin at the weld line portion, which would otherwise deteriorate the soft and flexible characteristics of the fibrous ribbon, can be prevented.

DESCRIPTION OF THE ACCOMPANYING DRAWINGS

These and other objects as well as advantageous features of the present invention will be readily understood from the following detailed description of a preferred embodiment, with reference to the accompanying drawings, wherein.

DESCRIPTION OF PREFERRED EMBODIMENTS

The present invention will now be described in detail with reference to FIG. 1.

Figure 1:
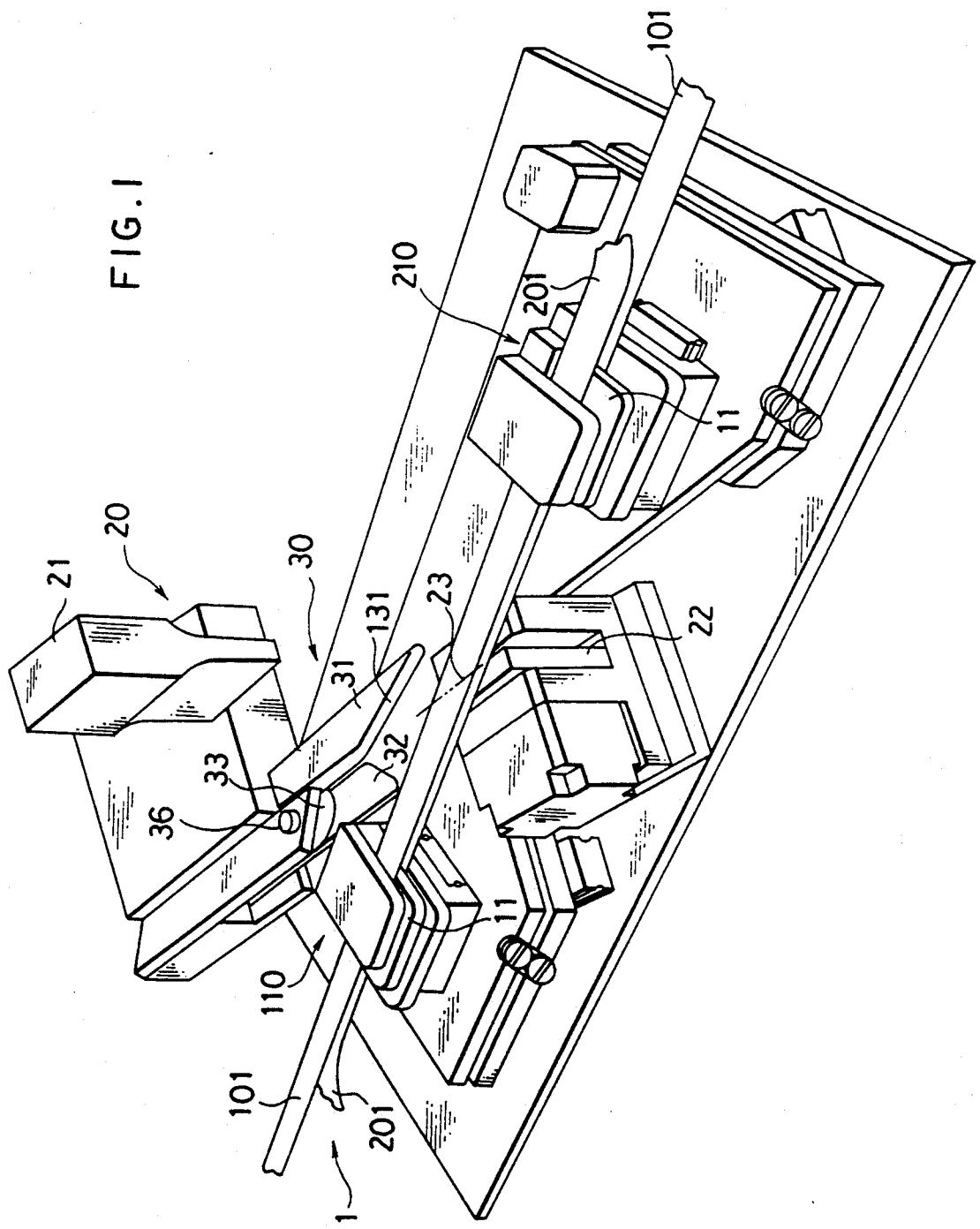
FIG. 1 is a perspective view illustrating an apparatus for manufacturing an endless ribbon, as a preferred embodiment according to the present invention.

FIG. 1 shows one embodiment of an apparatus for manufacturing an endless ribbon according to the present invention. The manufacturing apparatus comprises a pair of clamping devices 110 and 210 for clamping a ribbon 1 at both ends of an overlapped portion thereof, an ultrasonic welder 20 for welding a central part of the overlapped portion of the ribbon 1, and a cutting device 30 for cutting off superfluous ribbon ends 201, leaving a joined main ribbon body 101.

Figure 2:
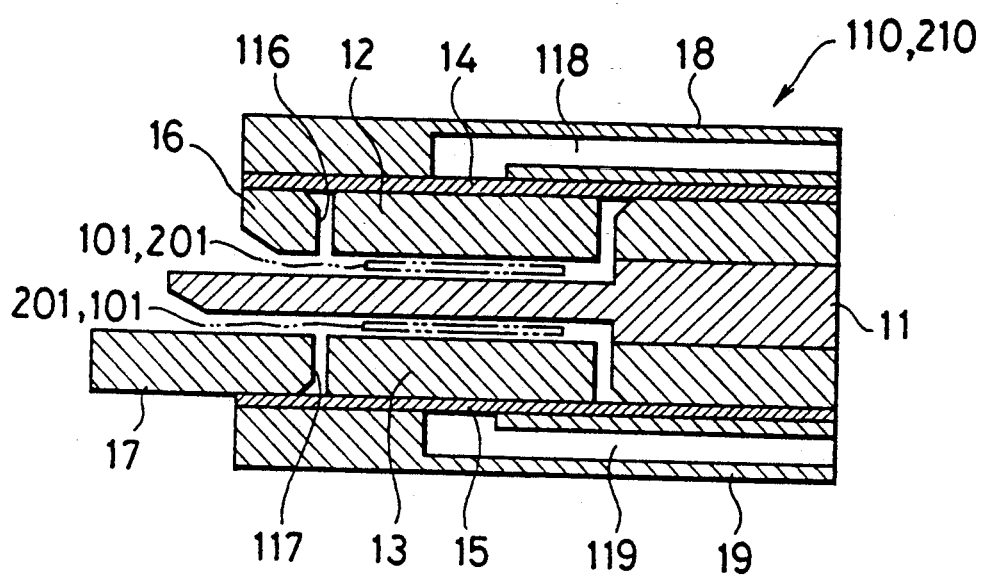
FIG. 2 is a cross sectional view illustrating the constitution of a clamping device.

As shown in FIG. 2, each of the clamping devices 110 and 210 has a spacer 11 in the shape of a thin plate, to be positioned during welding between the main ribbon body 101 and a superfluous ribbon end 201 overlapped therewith so that a vertical space between the main ribbon body 101 and the superfluous ribbon end 201 is determined by the thickness of the spacer 11 when the two ends of the ribbon 1 are overlapped.

Also as shown in FIG. 2, an upper clamping member 12 and a lower clamping member 13 are respectively disposed on the upper and lower sides of each spacer 11, each at a predetermined vertical spacing with respect to the spacer 11.

Figure 3:
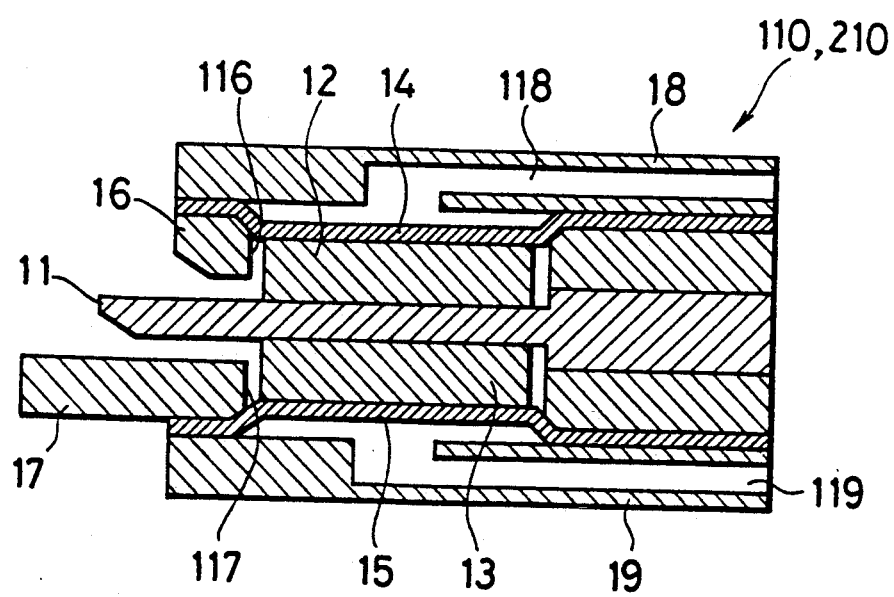
FIG. 3 is a view, similar to FIG. 2, illustrating the state of operation of a clamping member.

As shown in FIG. 3, each of the clamping members 12 and 13 is adapted to be operated when each of corresponding driving members 14 and 15 made of an expansible material such as rubber deforms.

In other words, as shown in FIGS. 2 and 3, the clamping member 12 is disposed in an opening 116 of a support frame 16 and is fixed to the driving member 14. The driving member 14 is fixed between a retainer member 18, which has a high-pressure air supply channel 118, and the support frame 16. The driving member 14 is made to deform outward when air at a high pressure is supplied to the back of the driving member 14 through the supply channel 118, so that it presses against the clamping member 12, clamping the main ribbon body 111 (or the superfluous ribbon end 201) between the spacer 11 and the clamping member 12.

Another clamping member 13 is constituted and adapted to function in the same manner as that of the clamping member 12.

Figure 4:
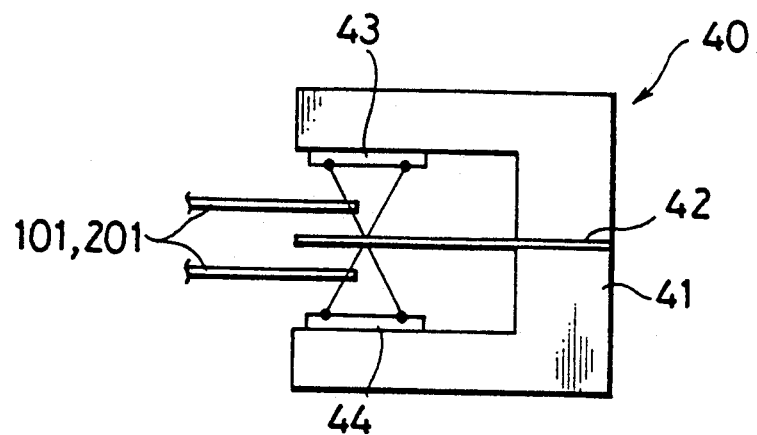
FIG. 4 is an explanatory view illustrating the constitution of a positioning device.

To laterally align the main ribbon body 101 and the superfluous ribbon end 201 to be overlapped one above the other, a positioning device 40 of a structure shown in FIG. 4 is disposed near each of the clamping devices 110 and 210 in FIG. 1 (the devices 40 are not shown in FIG. 1 for avoiding complexity).

As shown in FIG. 4, the positioning device 40 comprises a U-shaped support member 41, a reflector plate 42 disposed in a central portion of the support member 41, and two light-receiving/emitting devices 43 and 44 (for example, infrared ray receiver/emitters) opposed vertically to each other by way of the reflector plate 42 therebetween. The light-receiving/emitting devices 43 and 44 are previously positioned accurately in such a manner that they are actuated when the main ribbon body 101 and the superfluous ribbon end 201 are inserted to the same lateral position. Each of the clamping members 12 and 13 is adapted to operate when the corresponding light-receiving/emitting devices 43 and 44 operate, by appropriate means capable of converting detection signals from the devices 43 and 44 into air pressure.

As shown in FIG. 1, the ultrasonic welder 20 comprises an ultrasonic welding horn 21 positioned above the overlapped portion of the ribbon 1 and an anvil 22 positioned below the overlapped portion, in such a manner that the central part of the overlapped portion of the ribbon 1 is welded along a weld line 23 at an angle to the longitudinal direction of the ribbon 1 by moving the ultrasonic welding horn 21 downward and applying ultrasonic waves to the ribbon.

Figure 5:
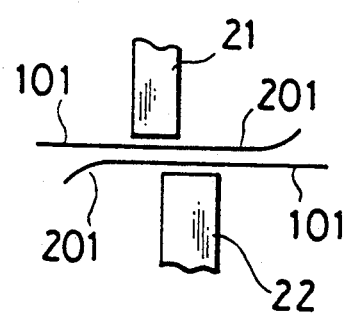
FIG. 5 is an explanatory view illustrating the position relationship between an ultrasonic welding horn and an anvil during welding.
Figure 6:
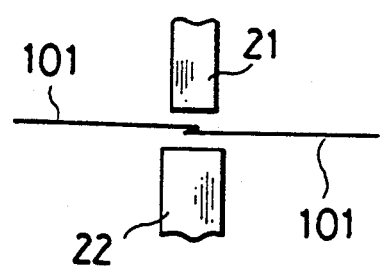
FIG. 6 is an explanatory view illustrating the position relationship between an ultrasonic welding horn and an anvil when shaping is applied to a welded portion.

Welding is applied, as shown in FIG. 5, at a narrow area between the ultrasonic welding horn 21 and the anvil 22 which face each other, but the operation area is increased for an operation of shaping the ribbon after the superfluous ribbon ends 201 have been cut off by a cutting device 30, to be described later, as shown in FIG. 6.

The shaping may be done by using the ultrasonic welder 20 itself, or an additional shaping device not illustrated, may be used instead.

Figure 7:
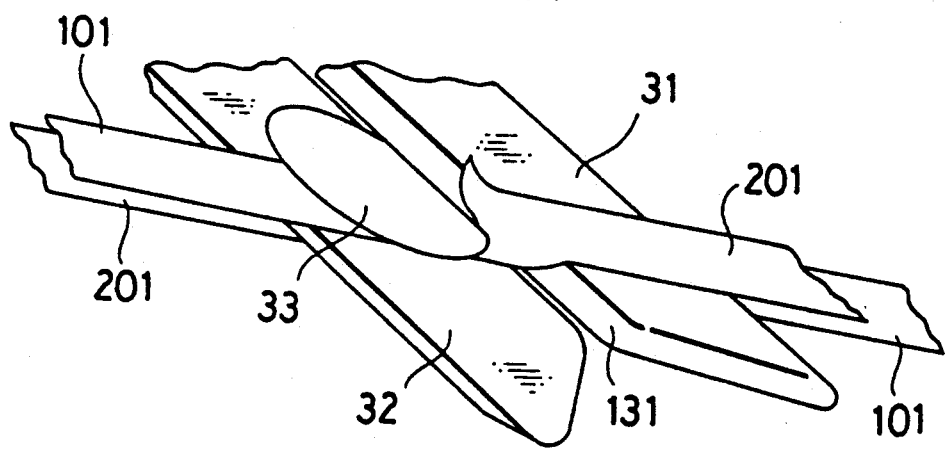
FIG. 7 is an enlarged view of the cutting device shown in FIG. 1.
Figure 8:
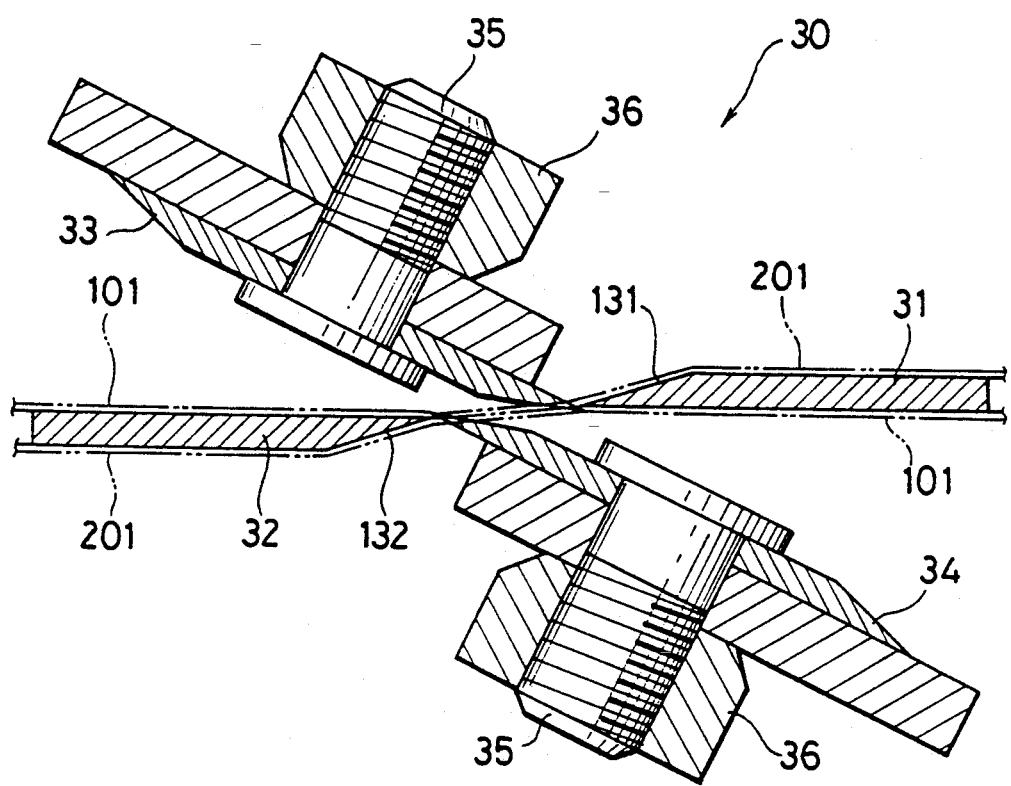
FIG. 8 is a cross-sectional view illustrating the constitution of the cutting device.

As shown in FIGS. 1, 7, and 8, the cutting device 30 comprises a combination of an upper guide member 31, which is to be inserted between the main ribbon body 101 and the superfluous ribbon end 201 after the welding along the weld line 23, and an upper cutter 33 for cutting off the superfluous ribbon end 201 in cooperation with the upper guide member 31.

A similar combination of a lower guide member 32 and a lower cutter 34 is also provided.

As shown in FIG. 8, the upper guide member 31 has an inclined surface 131 on the side thereof near the superfluous ribbon end 210 that is gradually tapered toward the welded portion, and the top edge thereof is formed like the edge of a scissors blade, so that the superfluous ribbon and 201 can be cut off stably in cooperation with the cutter 33.

The lower guide member 132 is constituted in a similar manner and is combined with the lower cutter 134.

As shown in FIGS. 7 and 8, each of the cutters 33 and 34 has a disc-like blade structure which is free to rotate around a mounting bolt 35 and can be detached for exchange by loosening a nut 36 that is screwed onto mounting bolt 35.

Figure 9:
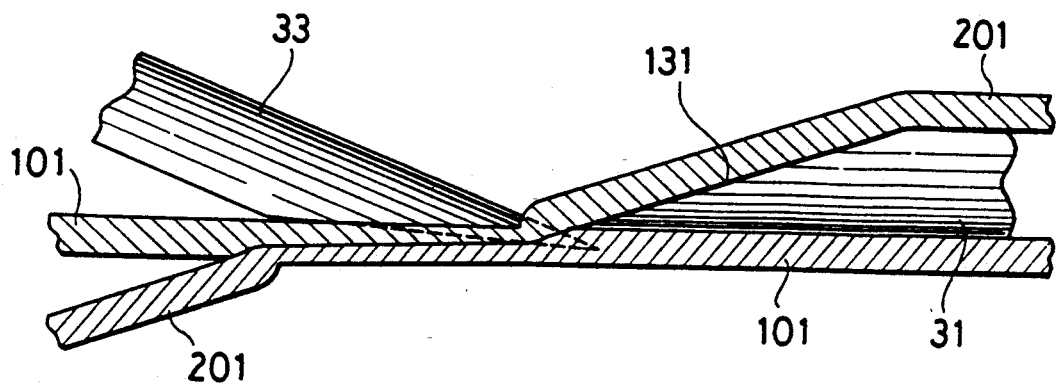
FIG. 9 is a detailed view of a portion shown in FIG. 8.

As shown in FIGS. 8 and 9, the upper cutter 33 is in contact at a predetermined angle of inclination with the upper guide member 31 so that the edge of the guide member 31 and the edge of the cutter 33 are brought into contact with each other at the position for cutting the superfluous ribbon end 201, so as to enable stable cutting.

The relationship between the lower guide member 31 and the lower cutter 34 is similar to that described above.

To cut off the superfluous ribbon end portions 201 by the corresponding guide members 31 and 32 and the cutters 33 and 34, it is necessary to move the cutting device 30 toward the ribbon. In this case, either or both of the cutting device 30 and the pair of clamping devices 110 and 120 that clamp the ribbon 1 may be displaced. Further, the two superfluous ribbon ends 201 may be cut off simultaneously by the corresponding guide members 31 and 32 and cutters 33 and 34. Alternatively, the cutting of the two ends may be done sequentially in such a manner that one of the superfluous ribbon ends 201 is cut during a forward operation, while the other of the superfluous ribbon ends 201 is cut during a backward operation.

The operation of this embodiment will now be described.

When an endless ribbon is manufactured, one end of the ribbon 1 (situated on the lower side in FIG. 1) is first placed between the lower clamping member 13 and the spacer 11 of each of the clamping devices 110 and 210 shown in FIG. 2. When the ribbon 1 reaches a predetermined position, the light-receiving/emitting device 44 of the positioning device 40 shown in FIG. 4 is actuated, and an output from the device 40 causes air to be supplied at high pressure through the supply channel 119 to the back of the driving member 15. This bulges the driving member 15 upward as shown in FIG. 3, to thereby clamp the ribbon 1 between the spacer 11 and the lower clamping member 13 of each clamping device (note that the ribbon 1 is not shown in FIG. 3).

When the other end of the ribbon 1 is placed between the upper clamp member 20 and the spacer 11 in each clamping device 110 and 210, it is clamped between the spacer 11 and the upper clamping member 12 in the same manner as described above.

In this case, since each of the clamping members 12 and 13 is pressed against the spacer 11 by the deformation of the corresponding driving members 14 and 15, the ribbon 1 is clamped flat even if the thickness of the ribbon varies slightly. Accordingly, stable clamping can be obtained without injuring the ribbon 1.

After the two ends of the ribbon 1 have been clamped by the pair of clamping devices 110 and 210, the ultrasonic welding horn 21 between the two clamping device 110 and 210 moves downward and the central part of the overlapped portion of the ribbon 1 is placed between the ultrasonic welding horn 21 and the anvil 22, as shown in FIG. 5, and ultrasonic welding is applied thereto.

Then, after the completion of the ultrasonic welding, when the ultrasonic welding horn 21 is lifted upward, the cutting device 30 approaches the ribbon 1 and cuts each of the superfluous ribbon ends 201, as shown in FIG. 7 through FIG. 9.

After the completion of the cutting operation, the ultrasonic welding horn 21 lowers again, and the welded portion of the ribbon 1 is placed between the ultrasonic welding horn 21 and the anvil 22, as shown in FIG. 6, and shaping is applied to smooth the welded portion.

In this operation, since the superfluous ribbon ends 201 are not cut off by weld-cutting or laser cutting as in the prior art, but are cut by the guide members 31 and 32 and the cutters 33 and 34, the thermal load applied to the welded portion of the ribbon 1 can be reduced to prevent the welded portion from stiffening which would otherwise lead to the deterioration of the soft and flexible properties of the ribbon made of a fibrous material.

Furthermore, since each of the cutters 33 and 34 has a disc-like shape, the position relationship of the cutter edges with respect to the corresponding guide members 31 and 32 is always kept constant even if the mounting position of each cutter around its mounting bolt 35 changes, so that stable cutting is enabled.

Furthermore, since the entire circumferential edge of each of the cutters 33 and 34 is sharpened to form a blade edge, a fresh blade edge can always be placed opposite to the corresponding guide member 31 or 32 by rotating the cutter gradually around the bolt 35 if the blade edge should become worn and dull, so that efficient cutting can be done over a long period of time.

The description of the above embodiment has concerned a case in which each of the cutters 33 and 34 is kept stationary during the cutting of the corresponding superfluous ribbon end 201, but the cutter may be rotated, if necessary, during the cutting.

Further, it is not always necessary to make the cutters 33 and 34 disc-shaped; they can be modified somewhat into a shape such as a semi-circular shape, so long as each portion thereof corresponding to the guide members 31 and 32 has an arcuate shape.

In the present invention, as described above, since the two ends of the ribbon 1 are overlapped in parallel along the longitudinal direction thereof and, after ultrasonic welding, the superfluous ribbon ends 201 are cut off by the combined operation of the guide members 31 and 32 and the cutters 33 and 34, the thermal load applied to the welded portion of the ribbon 1 can be decreased, so that deterioration in the properties of the welded portion can be avoided.

Further, in the present invention, each of the clamping devices 110 and 120 comprises, as described above, the spacer 11 that is placed at a position between the main ribbon body 101 and the superfluous ribbon end 201 which are overlapped one above the other vertically, the clamping members 12 and 13 disposed on the upper and lower sides of the spacer 11, and the driving members 14 and 15 which are made of an expansible material such as rubber that is deformed by fluid pressure to press the corresponding clamping members 12 and 13, thereby clamping the main ribbon body 101 and the superfluous ribbon end 201 between the spacer 11 and the corresponding clamping members 12 and 13. Accordingly, the clamping status of the ribbon 1 can be stabilized and there is no worry of damaging the ribbon 1.

Having described a specific embodiment of our bearing, it is believed obvious that modification and variation of our invention is possible in light of the above teaching.

What is claimed is:

1. An apparatus for manufacturing an endless ribbon comprising:

a pair of clamping devices which are positioned along the path of a ribbon and are separated longitudinally from each other, for overlapping first and second ends of a ribbon longitudinally one above the other with a narrow space being kept between them, an ultrasonic welding device for welding together a central part of the overlapping portion of said ribbon along a weld line which is at an angle to the longitudinal direction of said ribbon, a guide member inserted between a main ribbon body portion of said first end and a superfluous ribbon end portion of said second end which is longitudinally overlapping therewith and joined thereto by said weld line, said guide member having a thickness gradually reduced toward said weld line, and a cutter having an arcuate blade edge with at least its circumferential edge in contact with said superfluous ribbon end, said cutter cutting off said superfluous ribbon end from said main ribbon body for each of said ends, said cutting is made in the vicinity of said weld line in cooperation with said guide member.

2. An apparatus as defined in claim 1, wherein each clamping device comprises:

a spacer which is positioned between the main ribbon body portion of said first end and the superfluous ribbon end portion of said second end stacked one above the other, and clamping members disposed on opposite sides of said spacer, and driving members made of an expansible member such as rubber that is deformed by fluid pressure to press a corresponding clamping member, thereby clamping each of said main body portion of said first end and said superfluous ribbon end portion of said second end between said spacer and said corresponding clamping member.

3. An apparatus as defined in claim 1, further comprising a positioning device for laterally aligning the longitudinally overlapping main ribbon body portion of said first end and the superfluous ribbon end portion of said second end, said positioning device comprises, a U-shaped support member having an open end in which the main ribbon body portion of said first end and the superfluous ribbon end portion of said second end are inserted, a reflector plate disposed in a central portion of the U-shaped support member and positioned between said main ribbon body portion of said first end and said superfluous ribbon end portion of said second end, and light-receiving/emitting devices reflect off opposite sides of said reflector plate, whereby each of said light-receiving/emitting devices actuates one of the clamping devices when said main ribbon body portion of said first end or said superfluous ribbon end portion of said second end interrupts the reflection of light between said light-receiving/emitting device and said reflector plate.

4. An apparatus as defined in claim 1, wherein the cutter has a single-sided edge, disc-shaped configuration rotatably positioned around a stationary mounting member, wherein contact with the superfluous ribbon end portion of said second end is changeable along the circumference of said cutter by rotating around said mounting member.

* * * * *